June 7, 1927.
W. A. RHOADES ET AL
1,631,759
METHOD AND MEANS FOR SKIMMING GLASS
Filed July 22, 1925　　2 Sheets-Sheet 1
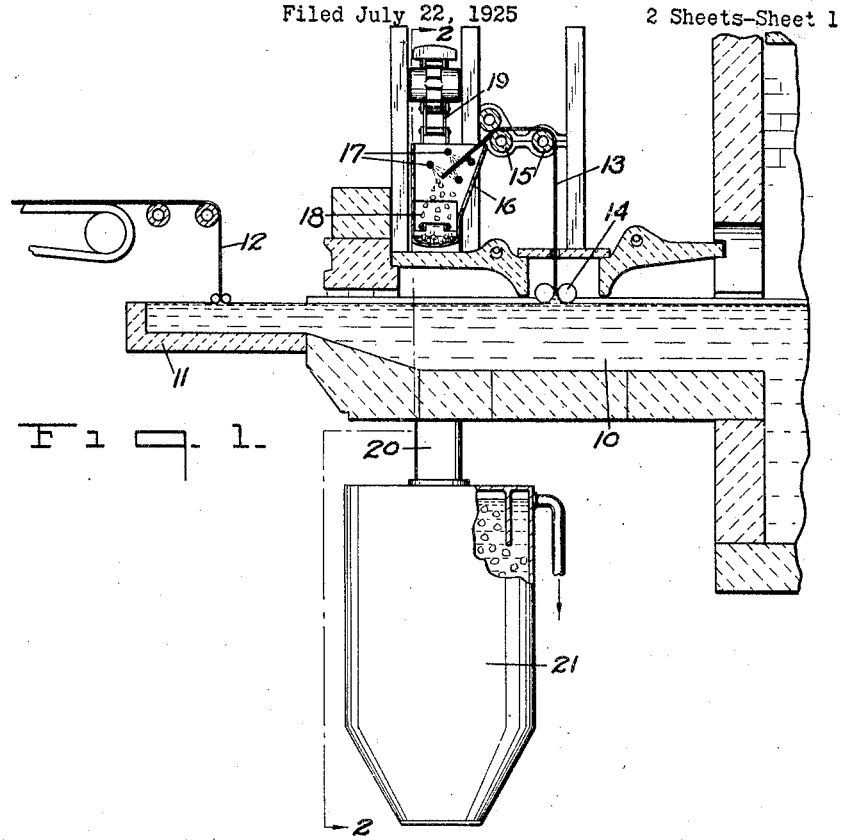
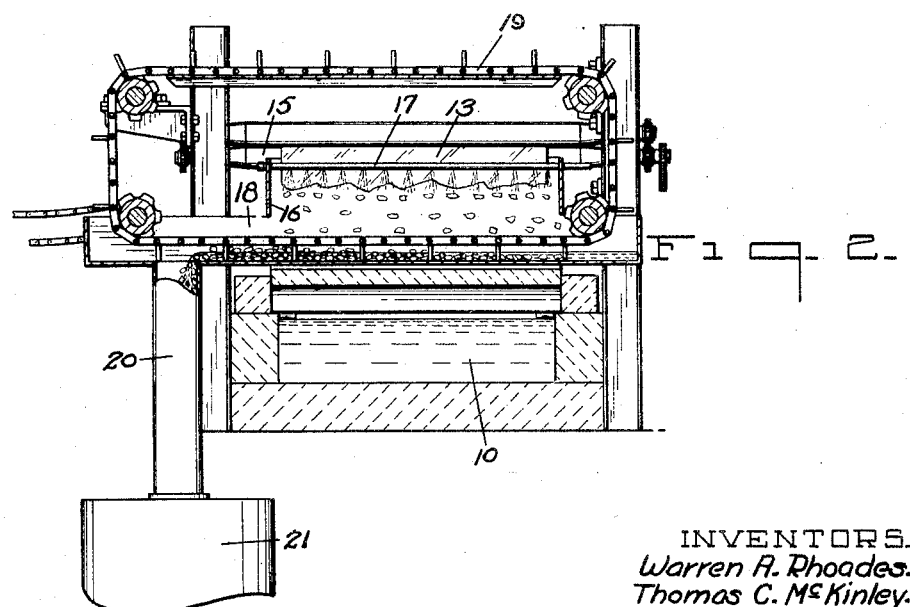
INVENTORS.
Warren A. Rhoades.
Thomas C. McKinley.
Frank Fraser
ATTORNEY.

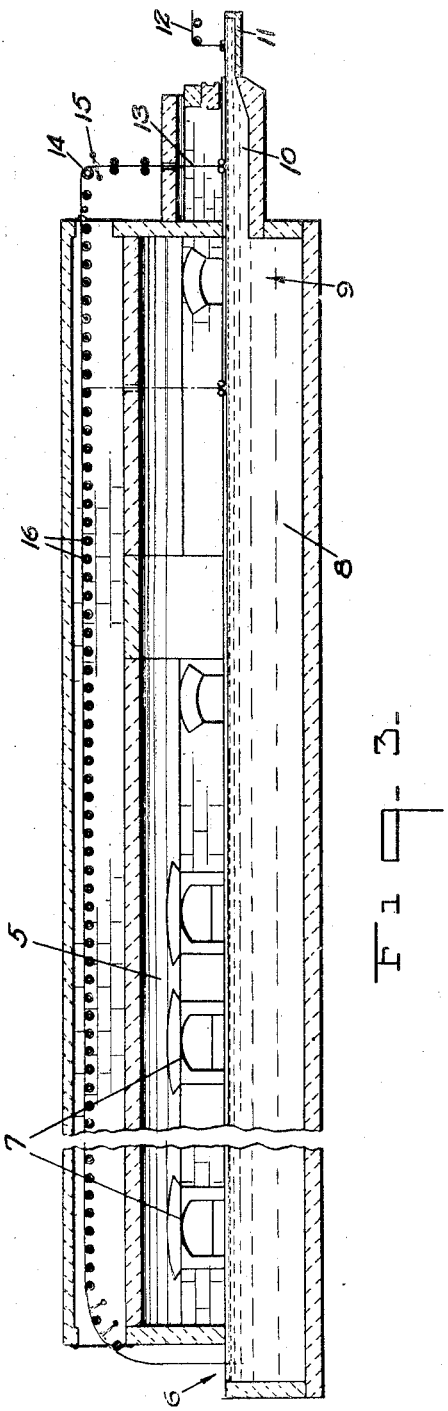

Patented June 7, 1927.

1,631,759

UNITED STATES PATENT OFFICE.

WARREN A. RHOADES, OF SHREVEPORT, LOUISIANA, AND THOMAS C. McKINLEY, OF CHARLESTON, WEST VIRGINIA, ASSIGNORS TO THE LIBBEY-OWENS SHEET GLASS COMPANY, OF TOLEDO, OHIO, A CORPORATION OF OHIO.

METHOD AND MEANS FOR SKIMMING GLASS.

Application filed July 22, 1925. Serial No. 45,335.

The present invention relates to sheet glass apparatus, and has particular reference to means for skimming the glass from which the sheet is drawn, the skimmed glass being drawn off in sheet form, after which it is transferred into cullet.

An important object of the invention is to provide means for continuously skimming the surface of the molten glass from which the sheet is drawn, the skimmed glass being drawn off in sheet form, the sheet while hot being subjected to means for breaking it up into cullet which may be used again in the batch from which the molten glass is produced.

Other objects and advantages of the invention will become apparent during the course of the following description.

In the drawings wherein like numerals are employed to designate like parts throughout the same, Fig. 1 is a fragmentary vertical longitudinal section through a sheet glass apparatus illustrating my device in use, one end of the section being on a reduced scale, Fig. 2 is a transverse section showing one construction for removing the skimmed glass, and Fig. 3 is a vertical longitudinal section through the entire machine illustrating how the skimmed glass can be run back and reintroduced in the dog-house of the furnace.

In the manufacture of sheet glass, the batch is introduced within one end of the tank furnace in what is known as the doghouse. The batch which comprises the ingredients which go to make up the molten glass also includes a certain amount of cullet. Cullet is broken glass, and apparently improves the quality of molten glass when it is used.

The surface of the molten glass produced usually contains a certain amount of dirt or scum which is detrimental to the finished sheet which is drawn. Numerous schemes such as floaters have been used to dam up the surface glass so that it can be ladled off. This is not entirely satisfactory as it is impossible to hold back all of the surface scum and other foreign matter by the use of floaters.

In the present invention two or more sheets are drawn, the first sheet or two being drawn to remove the surface scum and other foreign matter, thus leaving a clean body of glass from which a commercial sheet of glass may be drawn. The surface skimming sheet may be broken up into cullet so that there is no actual waste as far as the removal of the glass in the tank is concerned, while the quality of commercial sheet drawn will be greatly improved.

In the drawings, the numeral 5 designates a form of tank furnace which may be used and includes at one end a dog-house 6 through which a batch is introduced within a furnace. Regenerators 7 are used to melt the batch to form a mass of molten glass 8. The glass flows through the furnace to the refining end 9 into a cooling chamber 10 and draw-pot 11 from which a sheet 12 may be drawn. It has been common practice heretofore to place a floater which is nothing more than a refractory slab or bar in the refining end or cooling chamber of the furnace in an effort to hold back any foreign matter which may be present on the surface of the glass.

In the present invention the surface of the molten glass is skimmed by drawing a sheet 13. The sheet 13 may be drawn from the cooling chamber or refining end and may be drawn in a similar manner to that in which the commercial sheet 12 is drawn. Of course exceptional care need not be exercisde in the formation of the sheet 13 as it is drawn purely for the purpose of skimming the molten glass. If desired, the rotatable knurled rolls 14 which are commonly used, may be provided to insure that a sheet be drawn, thus skimming the glass across its entire width. The sheet 13 may be deflected over the rolls 15 and run into a hopper 16 where sprays of cold water 17 may be applied to the hot glass, cracking it up to form cullet 18. The cullet may be moved along the trough by means of the endless conveyor 19 where it is dumped down through the chute 20 into a container 21. The glass which flows to the draw-pot 11 will then be clean so that the quality of the sheet 12 will be superior to a sheet drawn from a similar apparatus wherein the surface glass is not skimmed off.

In Fig. 3 a modified construction is used wherein the scavenger sheet 13 is drawn similar to the sheet 12, deflected over a roll 14, being reheated as at 15, passes over the top of the tank furnace 5, being supported upon the rolls 16, and is adapted to be reintroduced into the furnace through the dog-house 6.

Various methods may be devised for handling this sheet after it has been drawn, the broad idea being to skim the molten glass to remove foreign matter so that a first-class commercial sheet may be produced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of producing sheet glass, consisting in providing a mass of molten glass, skimming the molten glass by drawing the surface therefrom in sheet form, and then drawing a sheet from the skimmed glass.

2. The process of producing sheet glass, consisting in creating a mass of molten glass, skimming the molten glass by drawing the surface glass off in sheet form, forming this sheet into cullet, and then drawing a commercial sheet from the glass which has been skimmed.

3. The process of skimming a mass of molten glass, consisting in drawing the surface thereof off in sheet form, and reintroducing the same in the form of cullet back into the mass of molten glass.

4. In sheet glass apparatus, means for containing a mass of molten glass, means for skimming the molten glass including means for drawing a sheet from the surface thereof, and means for drawing a commercial sheet from the glass that has been skimmed.

5. In sheet glass apparatus, means for containing a mass of molten glass, means for removing the surface glass thereof in sheet form which is later broken up into cullet, and means for drawing a sheet from the remaining glass.

6. In sheet glass apparatus, a tank furnace including a draw-pot containing a mass of molten glass, and means for removing the surface of the glass in sheet form before it reaches the draw-pot.

7. In sheet glass apparatus, a tank furnace including a draw-pot and containing a mass of molten glass, means for removing the surface of the glass in sheet form before it reaches the draw-pot, means for forming the surface glass into cullet, and means for drawing a sheet from the glass in the draw-pot.

8. In sheet glass apparatus, a tank furnace including a draw-pot and containing a mass of molten glass, means for skimming the molten glass and returning the skimmed portion back to the intake end of the furnace.

9. In sheet glass apparatus, a tank furnace including a draw-pot and containing a mass of molten glass, means for skimming the molten glass and returning the skimmed portion back to the intake end of the furnace, and means for drawing a sheet from the remaining glass.

10. In sheet glass apparatus, a tank furnace including a draw-pot and containing a mass of molten glass, means for removing the surface glass in sheet form and returning it to the intake end of the furnace, and means for drawing a commercial sheet from the remaining glass in the draw-pot.

Signed at Shreveport, in the parish of Caddo, and State of Louisiana, this 13th day of July, 1925.

WARREN A. RHOADES.

Signed at Charleston, in the county of Kanawha, and State of West Virginia, this 7th day of July, 1925.

THOMAS C. McKINLEY.